United States Patent
Shanahan et al.

(10) Patent No.: US 6,303,869 B1
(45) Date of Patent: Oct. 16, 2001

(54) FLEXIBLE CONDUIT

(75) Inventors: Gregory A. Shanahan, Sterling Heights; Kevin L Rutkowski, Mt. Clemens, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 08/281,958

(22) Filed: Jul. 28, 1994

Related U.S. Application Data

(63) Continuation of application No. 08/086,296, filed on Jul. 6, 1993, now abandoned.

(51) Int. Cl.$^7$ .................................................. H01B 17/26
(52) U.S. Cl. ................................. 174/153 G; 174/65 G; 138/96 R; 138/109; 138/114
(58) Field of Search ........................ 174/153 G, 65 G, 174/136; 138/96 R, 109, 103, 111, 114, 118, 119; 285/226, 19, 176; 29/450, 451, 452, 453, 868, 825

(56) References Cited

U.S. PATENT DOCUMENTS

| | | | |
|---|---|---|---|
| 2,864,591 | 12/1958 | Frink | 138/109 |
| 2,884,771 | 5/1959 | Holt | 464/53 |
| 2,897,533 | 8/1959 | Bull et al. | 174/153 G X |
| 2,909,198 | 10/1959 | Kramer et al. | 138/109 |
| 3,060,069 | 10/1962 | Sindars | 174/136 X |
| 3,131,954 | 5/1964 | Kramer et al. | 138/109 X |
| 3,151,905 | 10/1964 | Reuther et al. | 174/153 G X |
| 3,193,613 | 7/1965 | Van Buren, Jr. | 174/153 G X |
| 3,349,805 | 10/1967 | Fried | 138/109 |
| 3,380,318 | 4/1968 | Henning | 74/502.4 |
| 3,716,733 | 2/1973 | Keith et al. | 174/136 X |
| 4,169,572 | 10/1979 | Simon | 174/153 G X |
| 4,436,265 | 3/1984 | Simon | 174/153 G X |
| 4,568,047 | 2/1986 | Matsui | 174/153 G X |
| 4,711,974 | 12/1987 | Brosh | 174/65 R |
| 4,943,109 | 7/1990 | Skrbina et al. | 174/72 A |
| 4,966,202 | 10/1990 | Bryan et al. | |

FOREIGN PATENT DOCUMENTS

| | | | |
|---|---|---|---|
| 1146154 | 3/1963 | (DE) | 174/153 G |
| 2556506 | 6/1977 | (DE) | 174/153 G |
| 1523325 | 5/1968 | (FR) | 174/153 G |
| 1545869 | 11/1968 | (FR) | 174/153 G |
| 0904770 | 8/1962 | (GB) | 174/153 G |

*Primary Examiner*—Albert W. Paladini
(74) *Attorney, Agent, or Firm*—Mark P. Calcaterra

(57) ABSTRACT

A flexible, open-ended conduit for an electrical harness. The conduit has a central tubular section and a grommet at each end. The grommets are each of a size and shape to fit in a panel opening of similar size and shape. One of the panel openings is non-circular and the corresponding non-circular grommet has to be turned to fit in the opening. Turning the grommet causes the conduit to twist. To prevent kinking or buckling of the conduit due to twisting, the conduit has a screw-like helical formation. Instead of kinking or buckling, the conduit when twisted merely elongates or contracts.

1 Claim, 2 Drawing Sheets

FLEXIBLE CONDUIT

CROSS-REFERENCE TO RELATED APPLICATION

This application is a continuation of application Ser. No. 08/086,296, filed Jul. 6, 1993, now abandoned by the same inventors as in the present application.

This invention relates generally to conduits and refers more particular to flexible conduits for electrical harnesses and the like.

BACKGROUND AND SUMMARY

Flexible conduits are used as protective coverings for electrical and hydraulic power harnesses in automotive vehicles. These harnesses may extend through openings in spaced panels, such, for example, as the panels of a vehicle body pillar and door, and need to be covered and protected in the space between the panels.

The protective conduits have grommets at the ends which engage in the panel openings. Very often at least one of these openings is non-circular and the corresponding grommet also has to be non-circular to fit in the opening. If the opening is set at an angle, the grommet may have to be turned to match the orientation of the opening and this may result in twisting the conduit. This twisting can cause the conduit to kink or buckle, usually near one of the grommets. In the past, the conduit has been made in an accordion fashion, but this also has resulted in undesirable kinking and buckling.

The conduit of the present invention is designed and constructed so that it can be twisted without kinking or buckling. The conduit has a screw-like spiral or helical formation on its outer surface. This reinforces the conduit so that it will not collapse. If the conduit is twisted in one direction, the spiral will cause the conduit to elongate. If the conduit is twisted in the opposite direction, the spiral will cause the conduit to shorten. However, in either case, kinking will not occur.

In accordance with the preferred embodiment to be described, the conduit has an elongated, flexible tubular section with an integral grommet at each end. The grommets are each of a size and shape adapted to fit in a panel opening of similar size and shape. One of the grommets and the opening in which it must fit are non-circular. The non-circular grommet will be turned if necessary to fit into the non-circular opening. Turning the non-circular grommet causes the conduit to twist. The tubular section has a screw-like helical formation which reinforces the conduit and prevents it from kinking or buckling or collapsing when twisted.

It is an object of this invention to provide a flexible conduit having the foregoing features.

Another object is to provide a conduit of simple construction, which can be readily and inexpensively manufactured, and which is rugged and durable in use.

These and other objects, features and advantages will become more apparent as the following description proceeds, especially when considered with the accompanying drawings.

DETAILED DESCRIPTION

Figure 1:
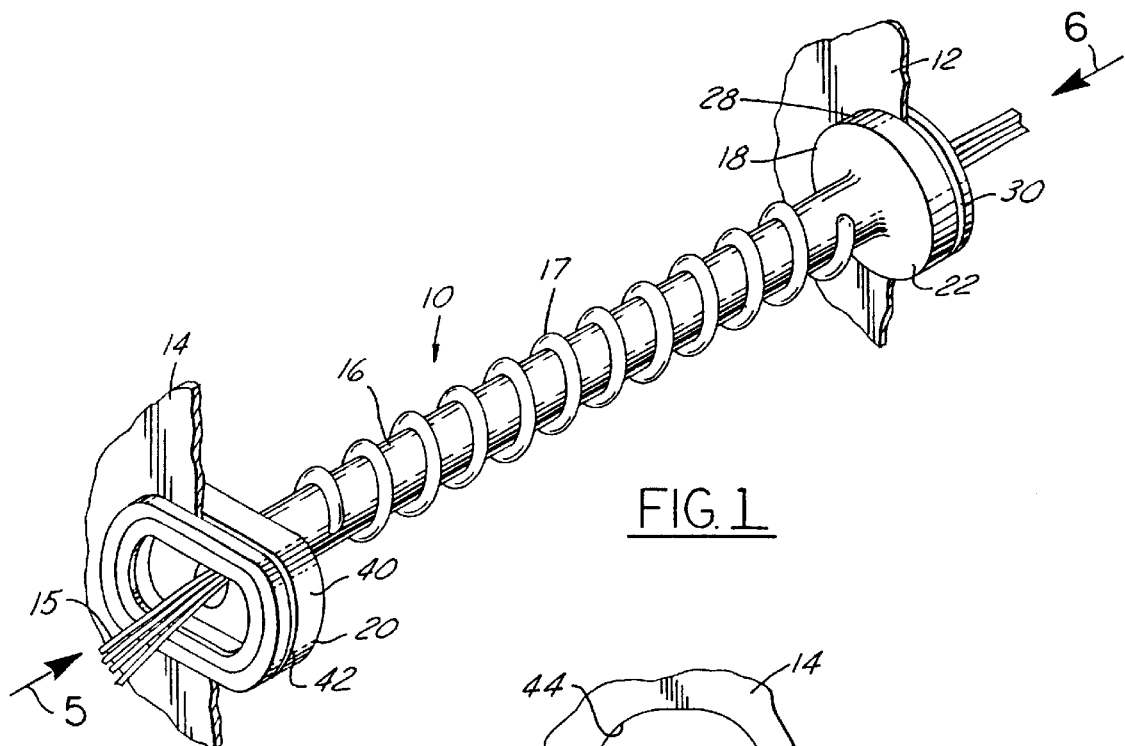
FIG. 1 is a perspective view of a flexible conduit embodying the invention, used as a protective covering for an electrical harness and shown extending between two panels with grommets at the ends of the conduit engaged in openings in the panels.

Referring now more particularly to the drawings, the open-ended, flexible conduit 10 is shown extending between two laterally spaced apart panels 12 and 14, which may, for example, be panels of a vehicle body pillar and door. The conduit provides a protective covering for an electrical harness 15 extending through the conduit.

The conduit 10 is preferably formed of a stretchable, compressible, resilient, elastomeric or rubber-like material, such as natural or synthetic rubber.

The conduit 10 has a central, elongated, tubular section 16, with integral, annular grommets 18 and 20 at the ends of the tubular section. The tubular section 16 has a wall of uniform thickness and is molded or formed with a screw-like helical formation 17 which defines a radially outwardly projecting ridge 19 on the outer surface of the tubular section and a groove 21 on the inner surface. The helical formation extends substantially the full length of the tubular section except for the funnel-shaped mouth at one end more fully described hereinafter.

The grommets 18 and 20 are enlarged relative to the tubular section 16. Grommet 18 is cup-shaped and has a circular base 22 extending radially outwardly from one end of the tubular section 16, perpendicular thereto. A central opening 24 in the base communicates with the passage 26 through the tubular section. The grommet 18 also has a cylindrical side wall 28 concentric with the tubular section and extending axially outwardly from the radially outer edge of the base. The side wall is preferably of uniform circular cross-section throughout its length and has a circular groove 30 in its outer surface. An annular flange 32 may extend radially inwardly from the side wall at the point where the groove is located, to reinforce the groove.

The panel 12 has an opening 33 of the same size and circular shape as side wall 28, or more precisely its groove 30, which fits removably in the groove.

The end of the tubular section 16 adjacent grommet 20 expands or flares radially outwardly toward the grommet in a funnel-shaped mouth 34 which integrally connects with the base 36 of grommet 20. The grommet 20 is cup-shaped. However, it is not circular like grommet 18, but rather it is oval-shaped. The base 36 of grommet 20 extends radially outwardly from the large end of the mouth 34. The base 36 is perpendicular to the tubular section 16 and the central opening 38 in the base coincides with the large end of the mouth. The annular side wall 40 of grommet 20 is oval in shape and concentric with the tubular section and extends axially outwardly from the oval radially outer edge of the base 36. An annular groove 42 is formed in the outer surface of the side wall 40. The side wall 40, like side wall 28, may have an annular flange 43 extending radially inwardly at the point where groove 42 is located, to reinforce the groove.

The panel 14 has an opening 44 of the same size and oval shape as side wall 40, or more precisely its groove 42, which removably fits in the groove.

Figure 2A:
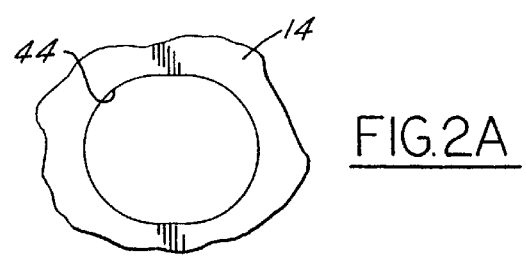
FIG. 2A is a fragmentary elevation showing the opening in the panel seen at the left in FIG. 2.
Figure 2:
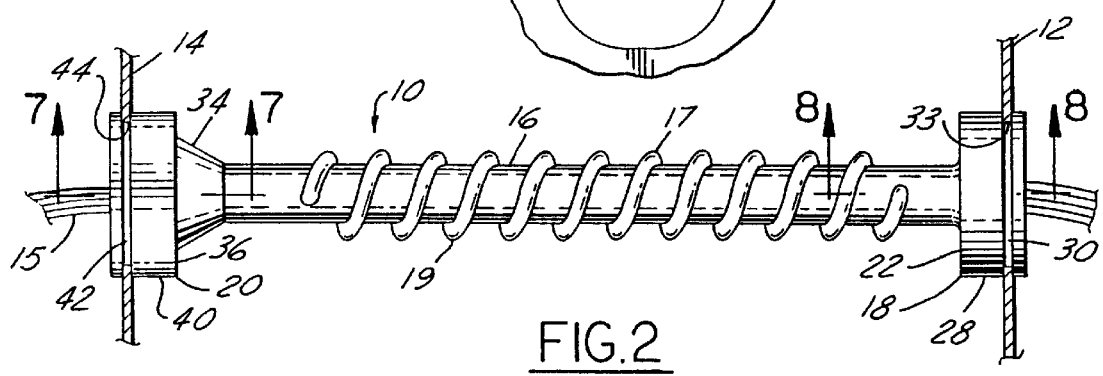
FIG. 2 is an elevational view of the conduit and panels in FIG. 1, with the panels in section.

FIG. 2 shows the conduit 10 extending between the two panels 12 and 14, with the opening 33 of panel 12 fitted in the groove 30 in the side wall 28 of grommet 18, and the opening 44 of panel 14 fitted in the groove 42 in the side wall 40 of grommet 20. The conduit is not twisted because of the particular orientation of the opening 44 in panel 14 (see FIG. 2A), and hence there is no problem of kinking or buckling.

Figure 3:
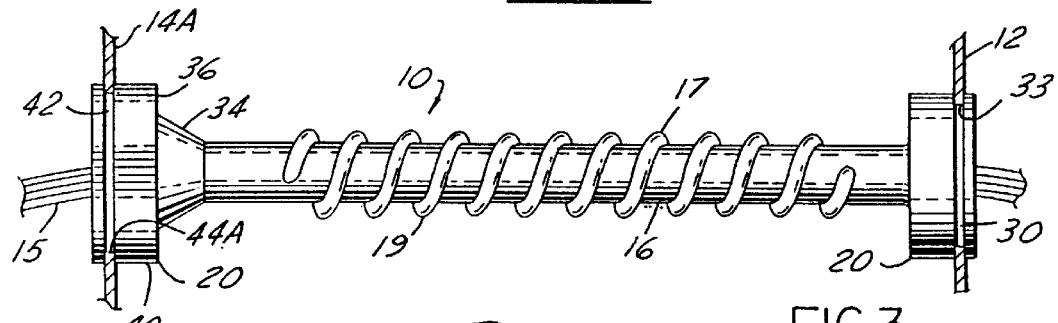
FIG. 3 is an elevational view similar to FIG. 2, but with the left grommet turned or rotated in one direction to fit in the turned opening in the left panel, causing shortening of the conduit as compared to FIG. 2.
Figure 3A:
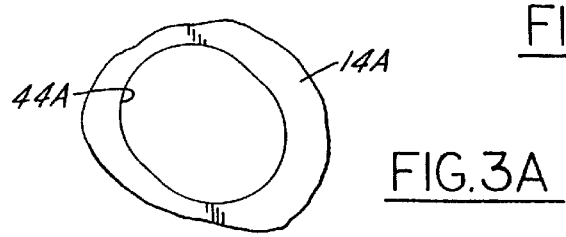
FIG. 3A is a fragmentary elevation showing the turned opening in the panel seen at the left in FIG. 3.

FIG. 3 shows the conduit extending between the panels 12 and 14A, with the opening 33 in panel 12 fitted in groove 30 of grommet 18, and opening 44A of panel 14A fitted in the groove 42 of grommet 20. In this case, the opening 44A, while of the same size and shape as the previously described opening 44, is turned in one direction (see FIG. 3A). This requires the conduit to be twisted. The helical formation causes the conduit when twisted to shorten. This can be seen by a comparison of the distance between panels in FIGS. 2 and 3. Also, it will be noted that the turns of the helical formation 17 are closer together in FIG. 3 than in FIG. 2. The helical formation 17 reinforces the conduit and prevents it from kinking or buckling.

Figure 4:
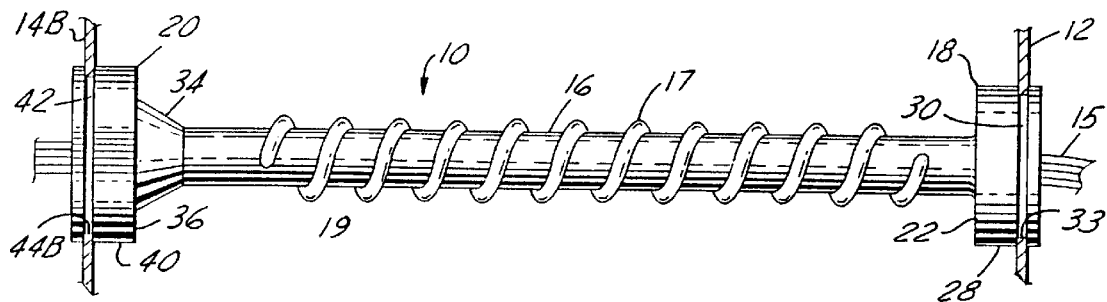
FIG. 4 is an elevational view similar to FIG. 2, but with the left grommet turned or rotated in the opposite direction from that of FIG. 3, to fit in the turned opening in the left panel, causing elongation of the conduit compared to FIG. 2.
Figure 4A:
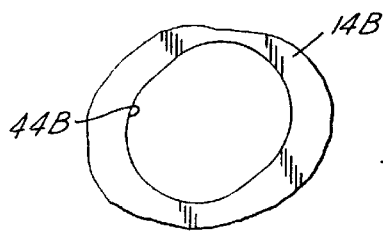
FIG. 4A is a fragmentary elevation showing the turned opening in the panel seen at the left in FIG. 4.
Figure 5:
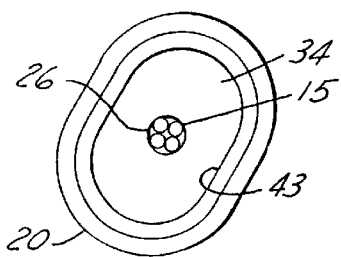
FIG. 5 is an end view of the conduit looking in the direction of the arrow 5 in FIG. 1.
Figure 6:
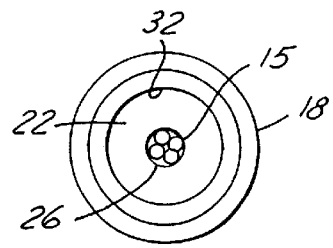
FIG. 6 is an end view of the conduit, looking in the direction of the arrow 6 in FIG. 1.
Figure 7:
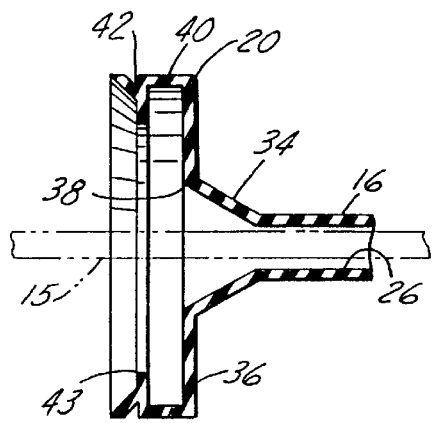
FIG. 7 is a fragmentary sectional view taken on the line 7—7 in FIG. 2.
Figure 8:
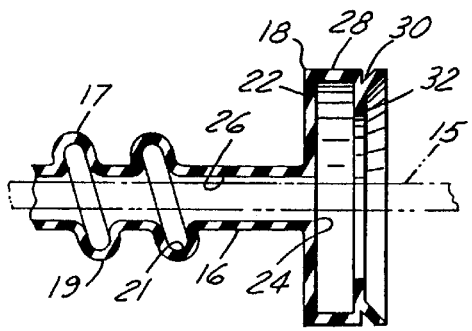
FIG. 8 is a fragmentary sectional view taken on the line 8—8 in FIG. 2.

FIG. 4 shows the conduit extending between the panels 12 and 14B, with the opening 33 in panel 12 fitted in groove 30 of grommet 18, and an opening 44B in panel 14B fitted in the groove 42 of grommet 20. In this case, the opening 44B, while of the same size and shape as the previously described opening 44, is turned in the opposite direction from that shown in FIG. 3 (see FIG. 4A). When the grommet 20 is turned the conduit is twisted. The helical formation causes the conduit when twisted to elongate. This can be seen by a comparison of the distance between panels in FIGS. 2 and 4. Also, it will be noted that the turns of the helical formation are farther apart in FIG. 4 than in FIG. 2. Again, the helical formation reinforces the conduit and prevents it from kinking or buckling.

The conduit is stressed and tends to become distorted when twisted. Whereas, heretofore this distortion has caused the conduit to kink or buckle, the helical formation on the conduit of this invention relieves the distortion by an elongation or contraction of the conduit.

While the grommet 18 is shown as circular, it may be non-circular and fit in a non-circular opening in panel 12, in a manner similar to grommet 20.

What is claimed is:

1. The method of mounting an open-ended conduit for an electrical harness between a first panel having a first opening therein of predetermined size and shape and a second panel laterally spaced from said first panel and having a second opening therein of predetermined size and shape, comprising the steps of:

(a) providing an open-ended conduit for an electrical harness in the shape of an elongated tubular section having opposite ends and made of a flexible, stretchable, compressible, twistable material having a first integral grommet at one end of said tubular section of the same size and shape as said first opening and a second integral grommet at the opposite end of said tubular section of the same size and shape as said second opening, said second opening and said second grommet being non-circular, said tubular section being of uniform wall thickness and formed with an integral, radially outwardly projecting screw-like, helical formation extending throughout substantially the full length thereof;

(b) fitting said first grommet in said first opening;

(c) aligning said second grommet with said second opening, and then twisting said conduit about its longitudinal axis in one direction such that the helical formation causes lengthening of the tubular section without kinking or in the opposite direction such that the helical formation causes shortening of the tubular section without kinking as needed to rotatably orient said second grommet to match the orientation of said second opening; and (d) while said conduit remains twisted and said second grommet remains aligned with said second opening and rotatably oriented to match the orientation of said second opening, fitting said second grommet in said second opening.

* * * * *